(12) United States Patent
Vilas Boas et al.

(10) Patent No.: US 8,519,780 B1
(45) Date of Patent: Aug. 27, 2013

(54) CHARGE PUMP VOLTAGE REGULATOR

(75) Inventors: André Luis Vilas Boas, Campinas (BR);
Fabio Duarte De Martin, Campinas (BR); Alfredo Olmos, Austin, TX (US);
André L. R. Mansano, The Hague (NL)

(73) Assignee: Freescale Semiconductor, Inc., Austin, TX (US)

( * ) Notice: Subject to any disclaimer, the term of this patent is extended or adjusted under 35 U.S.C. 154(b) by 29 days.

(21) Appl. No.: 13/368,793

(22) Filed: Feb. 8, 2012

(51) Int. Cl.
*G05F 1/10* (2006.01)
(52) U.S. Cl.
USPC ............................................. 327/536
(58) Field of Classification Search
USPC .......................................... 327/534, 536, 537
See application file for complete search history.

(56) References Cited

U.S. PATENT DOCUMENTS

| | | | |
|---|---|---|---|
| 5,381,051 A | 1/1995 | Morton | |
| 6,002,599 A | 12/1999 | Chow | |
| 6,018,264 A * | 1/2000 | Jin | 327/536 |
| 6,518,828 B2 | 2/2003 | Seo et al. | |
| 7,504,876 B1 * | 3/2009 | Raghavan et al. | 327/536 |
| 7,795,951 B2 * | 9/2010 | Choy | 327/536 |
| 7,973,592 B2 | 7/2011 | Pan | |
| 8,040,175 B2 * | 10/2011 | Raghavan | 327/536 |
| 2002/0145892 A1 | 10/2002 | Shor et al. | |

OTHER PUBLICATIONS

Soldera, J., et al., "A Low Ripple Fully Integrated Charge Pump Regulator", Proceedings of the 16th Symposium on Integrated Circuits and Systems Design (2003), 0-07695-2009-X/03.

* cited by examiner

*Primary Examiner* — Jeffrey Zweizig

(57) ABSTRACT

A regulator (104) for a charge pump (102) includes a clock amplitude modulator (150) that changes voltage of a clock signal used in operation of the charge pump in response to changes in magnitude of output voltage of the change pump. The clock amplitude modulator is powered by an output of an auxiliary circuit (120). The output of the auxiliary circuit is at a higher voltage than an input voltage of the charge pump. A maximum amplitude of the voltage of the clock signal is higher than the input voltage of the charge pump.

20 Claims, 3 Drawing Sheets

CHARGE PUMP VOLTAGE REGULATOR

BACKGROUND

1. Field

This invention relates generally to charge pump voltage regulators, and more specifically a charge pump voltage regulator for use under low input voltage conditions.

2. Related Art

Most charge pumps are implemented with high voltage transistors. In this context, high voltage transistors are transistors that can support a drain-to-source voltage and a gate voltage that are relatively higher than the drain-to-source and gate voltages that medium and low voltage transistors can support. The threshold voltage $V_T$ of high voltage transistors is typically 700-800 mV and it could be sometimes higher. Many charge pumps do not work properly at low input voltage $V_{IN}$ conditions (e.g., when $V_{IN}$ is above the threshold voltage $V_T$ of high voltage transistors by 150-200 mV or less) and at a proper clock frequency for the charge pump. Therefore, many charge pumps do not work properly when $V_{IN}$ is less than about 1V.

A charge pump circuit comprises a charge pump and a regulator. Most charge pump circuits do not provide adequate line and load regulation when the input voltage goes below a nominal $V_{IN}$ because known charge pumps have their line and load regulation limited by V. Therefore, in low $V_{IN}$ applications, such as when $V_{IN}$ is provided by a low voltage battery, known regulators for charge pumps cannot always maintain a constant output voltage. For example, under certain low $V_{IN}$ conditions, known charge pump circuits may have difficulty maintaining the output voltage at a target voltage when the battery becomes weak. When $V_{IN}$ is about 1V or lower, and the target output voltage is higher than $V_{IN}$, known regulators may fail to maintain the target output voltage of known charge pumps.

Most charge pump circuits include a clock generator circuit for generating clock signals that are coupled to capacitors in the charge pump. The output voltage of most charge pumps is regulated by modulating the frequency of such clock signals.

In known regulators for known charge pumps, the clock generator circuit is powered by $V_{IN}$. Therefore, a maximum amplitude of clock signals that can be produced by the clock generator circuit of such known regulators is $V_{IN}$. Consequently, in battery-powered applications, the maximum amplitude of the clock signals that can be produced by the clock generator circuit is a voltage of a battery. A maximum output voltage of such known charge pumps is limited by the highest amplitude of the clock signals produced by the clock generator circuit. Therefore, in battery-powered applications, the maximum output voltage of such known charge pumps is dependent on, and limited by, the voltage of the battery. The output voltage $V_{OUT}$ of a charge pump is also dependent, in part, on a number of stages in the charge pump, an amount of current drain on the charge pump, capacitance of an output capacitor, and a frequency of the clock signals coupled to the capacitors in the charge pump.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
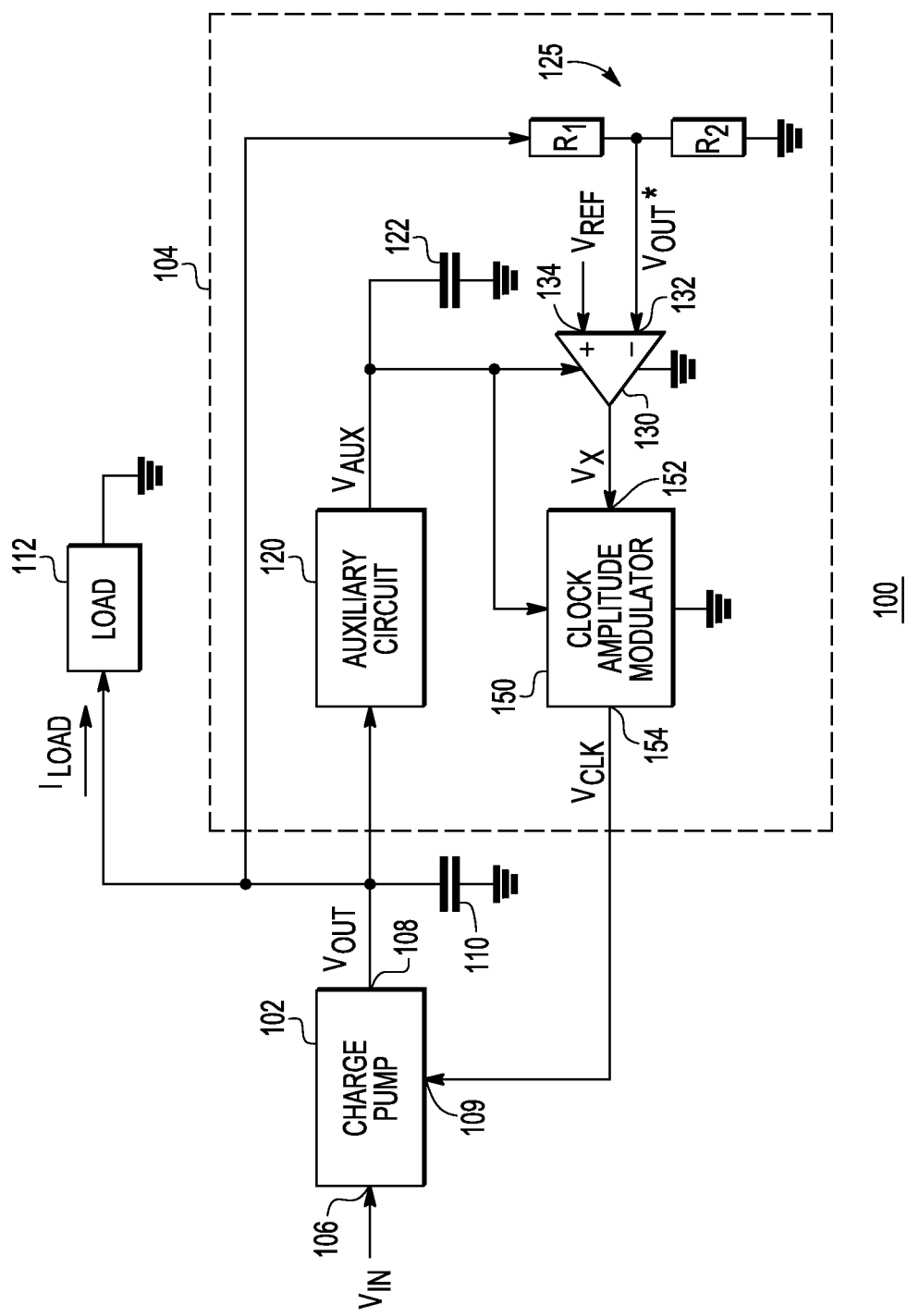
FIG. 1 is a simplified functional block diagram of one embodiment of a charge pump circuit including a charge pump and a charge pump voltage regulator in accordance with the invention.

FIG. 1 is a simplified functional block diagram of one embodiment of a charge pump circuit 100 in accordance with the invention including a charge pump 102 and a charge pump voltage regulator (hereinafter "regulator") 104. The charge pump 102 has an input terminal 106 for receiving an input voltage $V_{IN}$ and an output terminal 108 for outputting an output voltage $V_{OUT}$. For a battery-powered charge pump circuit 100, $V_{IN}$ is the battery voltage. The charge pump circuit 100 includes an output capacitor 110 coupled between the output terminal 108 and a ground terminal. A load 112 may be coupled to the output terminal 108. A current $I_{LOAD}$ flows from the output terminal 108 to a ground terminal though the load 112. The charge pump 102 has a clock input terminal 109 for receiving one or more clock signals.

The regulator 104 provides clock amplitude feedback for the charge pump 102. The regulator 104 controls a magnitude of the output voltage $V_{OUT}$ of the charge pump 102 by modulating an amplitude of the one or more clock signals that are coupled to the charge pump. Advantageously, an absolute value of the maximum amplitude of the one or more clock signals is higher than an input voltage $V_{IN}$ of the charge pump 102. The regulator 104 may also control the magnitude of the output voltage $V_{OUT}$ of the charge pump 102 by modulating a frequency of the one or more clock signals. The regulator 104 may also control the magnitude of the output voltage $V_{OUT}$ of the charge pump 102 by concurrently modulating the amplitude and the frequency of the one or more clock signals, wherein the maximum amplitude of the one or more clock signals is higher than the input voltage $V_{IN}$ of the charge pump. The regulator 104 provides line and load regulation suitable in portable devices supplied by a low voltage battery. In one embodiment, a low voltage battery has a nominal voltage of 1.2V. The charge pump circuit 100 is suitable with a sub-1V input power supply voltage $V_{IN}$, and may advantageously continue to function properly after a low voltage battery (e.g., a battery having a nominal voltage of 1.2V) becomes weaker than its nominal voltage (e.g., the voltage falling to 0.9V).

The regulator 104 includes an auxiliary stage 120, a voltage divider 125, an amplifier 130, and a clock amplitude modulator 150.

The auxiliary stage 120 multiplies $V_{OUT}$ and provides a supply voltage to the amplifier 130. The auxiliary stage 120 outputs an auxiliary voltage $V_{AUX}$. The regulator 104 is configured so that the value of $V_{AUX}$ is at least greater than the value of $V_{IN}$. In one embodiment, the input voltage of the auxiliary stage 120 is the output voltage $V_{OUT}$ of the charge pump 102. In such embodiment, $V_{AUX}$ is not only greater than $V_{IN}$ but also greater than $V_{OUT}$. The auxiliary stage 120 can be any circuit that generates a voltage greater than $V_{IN}$. In one embodiment, the auxiliary stage 120 is a charge pump, and the auxiliary stage 120 includes a circuit (not shown) for producing clock signals for use within the auxiliary stage, and an output capacitor 122. In one embodiment, the auxiliary stage 120 is a basic two-stage Dickson charge pump. In another embodiment, the auxiliary stage 120 is a voltage doubler with a bridge. In yet another embodiment, the auxiliary stage 120 is a voltage tripler with a bridge and a half. In still another embodiment, the auxiliary stage 120 is a boost switching power supply. In a further embodiment, the auxiliary stage 120 is any DC-to-DC converter. In yet a further embodiment, the auxiliary stage 120 is any voltage multiplier. Although in the embodiment illustrated in FIG. 1 the auxiliary stage 120 is powered by $V_{OUT}$, in still a further embodiment (not shown) the auxiliary stage is powered directly by V.

The magnitude of the output voltage $V_{OUT}$ of the charge pump 102 is affected by $V_{IN}$ and $I_{LOAD}$. The output voltage $V_{OUT}$ is fed into the voltage divider 125 that produces a voltage $V_{OUT}*$ in response to $V_{OUT}$. In one embodiment, the voltage divider 125 is a resistive ladder comprising $R_1$ and $R_2$, which produces the voltage $V_{OUT}*$ in response to $V_{OUT}$, as follows:

$$V_{OUT}* = V_{OUT} R_2 / (R_1 + R_2)$$

In one embodiment, $R_1 = 4R_2$.

The amplifier 130 compares $V_{OUT}*$ to a reference $V_{REF}$ and provides a proper $V_X$ to regulate $V_{OUT}$. $V_X$ is adjusted according to deviation in $V_{IN}$ at the input terminal 106 of the charge pump 102 and/or deviation in load current drawn from the output terminal 108 of the charge pump. The amplifier 130 has an inverted input terminal 132 and a non-inverted input terminal 134. $V_{OUT}*$ is fed into the inverted input terminal 132, and $V_{REF}$ is fed into the non-inverted input terminal 134. In one embodiment, the value pre-selected for $V_{REF}$ is related to $V_{IN}$. In one embodiment, $V_{REF}$ is a fraction of V. One example of $V_{REF}$ is $V_{IN}/2$. Another example of $V_{REF}$ is $V_{IN}/3$. In another embodiment, the value pre-selected for $V_{REF}$ is related to a bandgap voltage. In one example, $V_{REF}$ is the bandgap voltage. In another example, $V_{REF}$ is a fraction of the bandgap voltage. Resistive values of $R_1$ and $R_2$ are pre-selected such that $V_{OUT}*$ is equal to $V_{REF}$ when $V_{OUT}$ is at a target output voltage.

The amplifier 130 produces an amplified output signal $V_X$ responsive to a difference between $V_{OUT}*$ and $V_{REF}$. The value of $V_X$ can vary. The value of $V_X$ tracks the output voltage $V_{OUT}$ of the charge pump 102. At any instant after completion of start-up, the value of $V_X$ is representative of a present value of $V_{OUT}$. In one embodiment, the value of $V_X$ is directly and linearly proportional to the value of $V_{OUT}$. In the event the magnitude of $V_{OUT}$ begins dropping (because $V_{IN}$ decreased and/or $I_{LOAD}$ increased), the magnitude of $V_{OUT}*$ also drops, and, as a result, the amplifier 130 outputs the signal $V_X$ having a certain corresponding value to the clock amplitude modulator 150. In one embodiment, the amplifier 130 is powered by $V_{AUX}$ from the auxiliary stage 120. In another embodiment, the amplifier 130 is powered by $V_{OUT}$ directly from the charge pump 102. In yet another embodiment, the amplifier 130 is powered by $V_{IN}$ directly from the battery. In a further embodiment, $V_{IN}$ supplies the amplifier 130 with power during start-up only, and then the amplifier switches to $V_{AUX}$ for its power supply.

The clock amplitude modulator 150 includes an input terminal 152 that receives the signal $V_X$ from the amplifier 130. In one embodiment, the clock amplitude modulator 150 is powered by $V_{AUX}$. Advantageously, $V_{AUX}$ is higher than $V_{OUT}$, and, therefore, also higher than $V_{IN}$. The clock amplitude modulator 150 includes a circuit (not shown) for producing a clock signal, such as an internal RC oscillator, a crystal oscillator, or another type of circuit that generates a periodic signal. The clock amplitude modulator 150 produces one or more clock signals that are non-overlapping with respect to each other. Each of the one or more clock signals has a different phase than the other clock signals. In one embodiment, the frequency of the one or more clock signals is approximately 1 MHz. The clock amplitude modulator 150 shifts up and down the amplitude of the one or more clock signals. The clock amplitude modulator 150 includes one or more output terminals 154 from which the one or more clock signals are outputted to the charge pump 102. The charge pump 102 includes a plurality of capacitors (not shown). Each of the one or more clock signals is coupled to a ground-side plate of one of the capacitors of the charge pump 102. The clock signals control operation of the charge pump 102. The amplitude or the amplitude and frequency of the clock signals affect the magnitude of $V_{OUT}$. The one or more clock signals have a voltage $V_{CLK}$ whose amplitude depends on the value of the output $V_X$ of the amplifier 130. In one embodiment, the voltage $V_{CLK}$ may be equal to the value of $V_X$. The value of a maximum voltage of $V_{CLK}$ is the value of $V_{AUX}$ outputted by the auxiliary stage 120. The maximum voltage of $V_{CLK}$ is $V_{AUX}$ because the clock amplitude modulator 150 is powered by $V_{AUX}$. Advantageously, the value of maximum voltage of $V_{CLK}$ is greater than the value of $V_{IN}$. In another embodiment, the clock amplitude modulator 150 is powered by the voltage $V_{OUT}$ directly from the charge pump 102, and, although the voltage $V_{OUT}$ is lower than $V_{AUX}$, the voltage $V_{OUT}$ is, nevertheless, advantageously higher than the voltage $V_{IN}$.

The voltage divider 125, the amplifier 130 and the clock amplitude modulator 150 form part of a feedback loop from the output terminal 108 to the clock input terminal 109 of the charge pump 102. The feedback loop of the regulator 104 sets a new value for the amplitude of the at least one clock signal based on a present value of $V_{OUT}$. The feedback loop of the regulator 104 assures that the value of $V_{OUT}*$ is always very close to the value of $V_{REF}$. The value of $V_X$ varies to satisfy the equation $V_{OUT}* = V_{REF}$. The value of $V_X$ increases or decreases according to variation of $V_{OUT}$, which, in turn, may be caused by variation of $V_{IN}$ and/or $I_{LOAD}$.

The following is an example of operation of the regulator 104 when it is designed for maintaining $V_{OUT}$ of the charge pump 102 at a desired 2.5V when $V_{IN}$ of the charge pump is at a nominal 1.2V. If $V_{IN}$ were to drop to 0.9V (such as due to a weak battery), a known regulator may fail to maintain $V_{OUT}$ of the charge pump 102 at the desired 2.5V. Assuming that the known regulator is for a single-stage Dickson charge pump, a maximum $V_{CLK}$ is disadvantageously $V_{IN}$. Such known regulator fails to achieve $V_{OUT}$ at the desired 2.5V when $V_{IN}$ drops to 0.9V because 1.8V=0.9V+0.9V (=$V_{IN}$+maximum $V_{CLK}$) is the maximum $V_{OUT}$ that such known regulator can achieve. On the other hand, for the regulator 104 in accordance with the invention, if $V_{IN}$ were to drop to 0.9V, $V_{OUT}$ of the charge pump 102 would advantageously remain at 2.5V. For the regulator 104, when $V_{IN}$ of the charge pump 102 is at the nominal 1.2V, $V_{OUT}$ is 2.5V and $V_{AUX}$ is 3.5V. For the regulator 104, when $V_{IN}$ drops down to 0.9V, $V_{AUX}$ goes down to about 2.8V (assuming the auxiliary stage 120 is a basic Dickson charge pump) because $V_{AUX}$ depends, in part, on the voltage $V_{IN}$ of the clock signal going into the auxiliary stage, which has gone down from 1.2V to 0.9V. For the regulator 104, when $V_{IN}$ drops down to 0.9V, $V_{OUT}$ would initially tend to drop. However, because $V_{AUX}=2.8V$ is greater than the desired $V_{OUT}=2.5V$, the maximum voltage of the clock signal $V_{CLK}$ for the charge pump 102 can be, and is, higher than the nominal $V_{IN}=1.2V$. Therefore, $V_{OUT}$ advantageously does not drop below the desired $V_{OUT}=2.5V$. If $V_{IN}=1.2V$ and a desired $V_{OUT}$ is 2.5V, then, ideally, an amplitude of $V_{CLK}$ of only 1.3V is needed; however, due to losses in the circuit, the regulator 104 is designed, in one embodiment, so that $V_{CLK}$=1.4 to 1.5V.

In one embodiment, when $V_{OUT}$ decreases, the clock amplitude modulator 150 first increases the frequency of the clock signal until a maximum allowable frequency is reached, at which time, if the target $V_{OUT}$ has not been attained, then the clock amplitude modulator increases the voltage of the clock signal $V_{CLK}$ to values above $V_{IN}$. In another embodiment, when $V_{OUT}$ decreases, the clock amplitude modulator 150 first increases the voltage of the clock signal $V_{CLK}$ until it reaches $V_{AUX}$, at which time, if the target $V_{OUT}$ has not been attained, then the clock amplitude modulator increases the frequency of the clock signal. In yet another embodiment, when $V_{OUT}$ decreases, the clock amplitude modulator 150 concurrently increases the voltage and frequency of the clock signal. Of course, in each of these embodiments, when $V_{OUT}$ increases, the clock amplitude modulator 150 decreases the voltage or the frequency, or both, of the clock signal.

Figure 2:
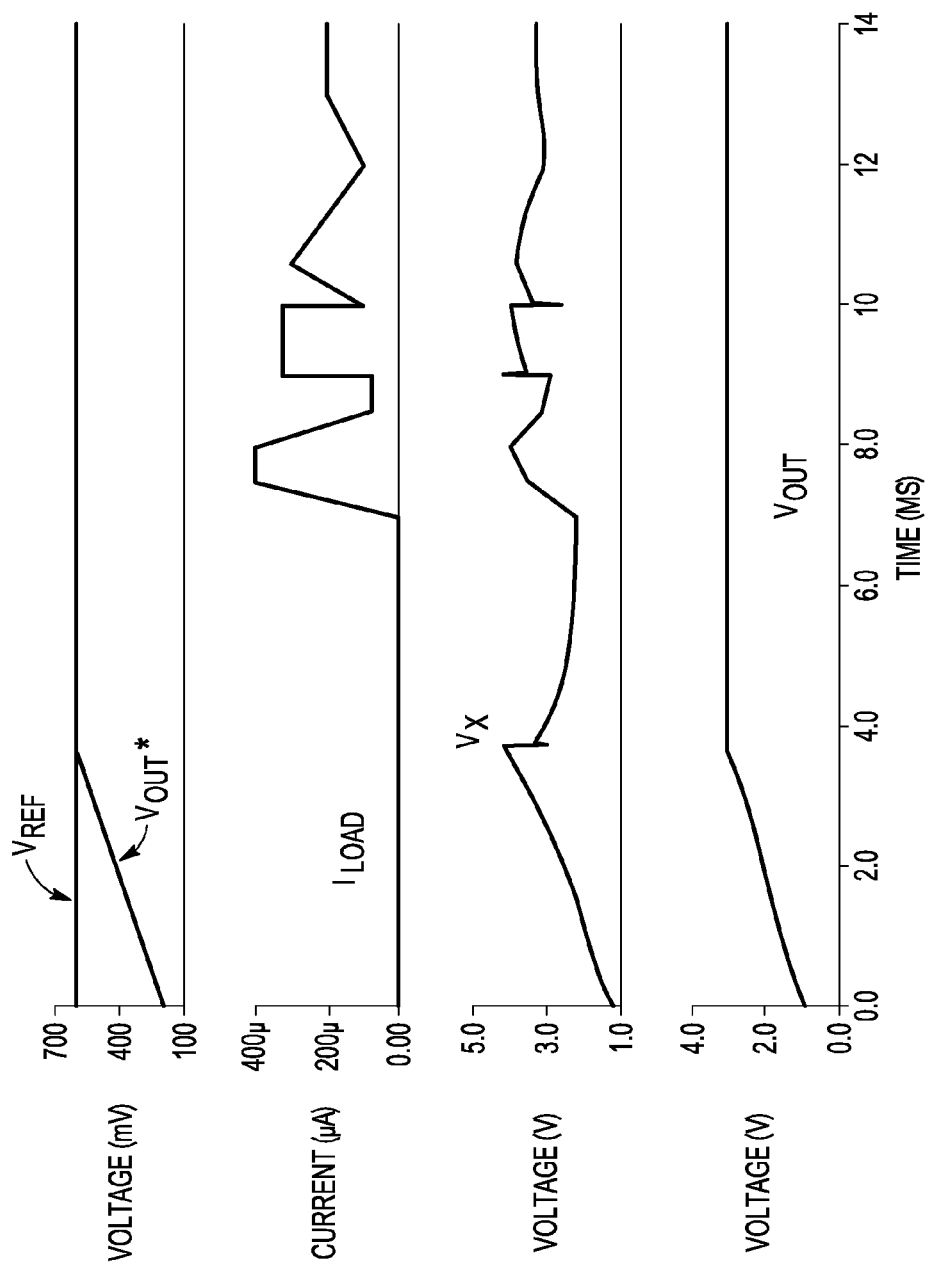
FIG. 2 is a set of graphs illustrating simulated operation of the charge pump circuit of FIG. 1 under various input voltage conditions.
Figure 3:
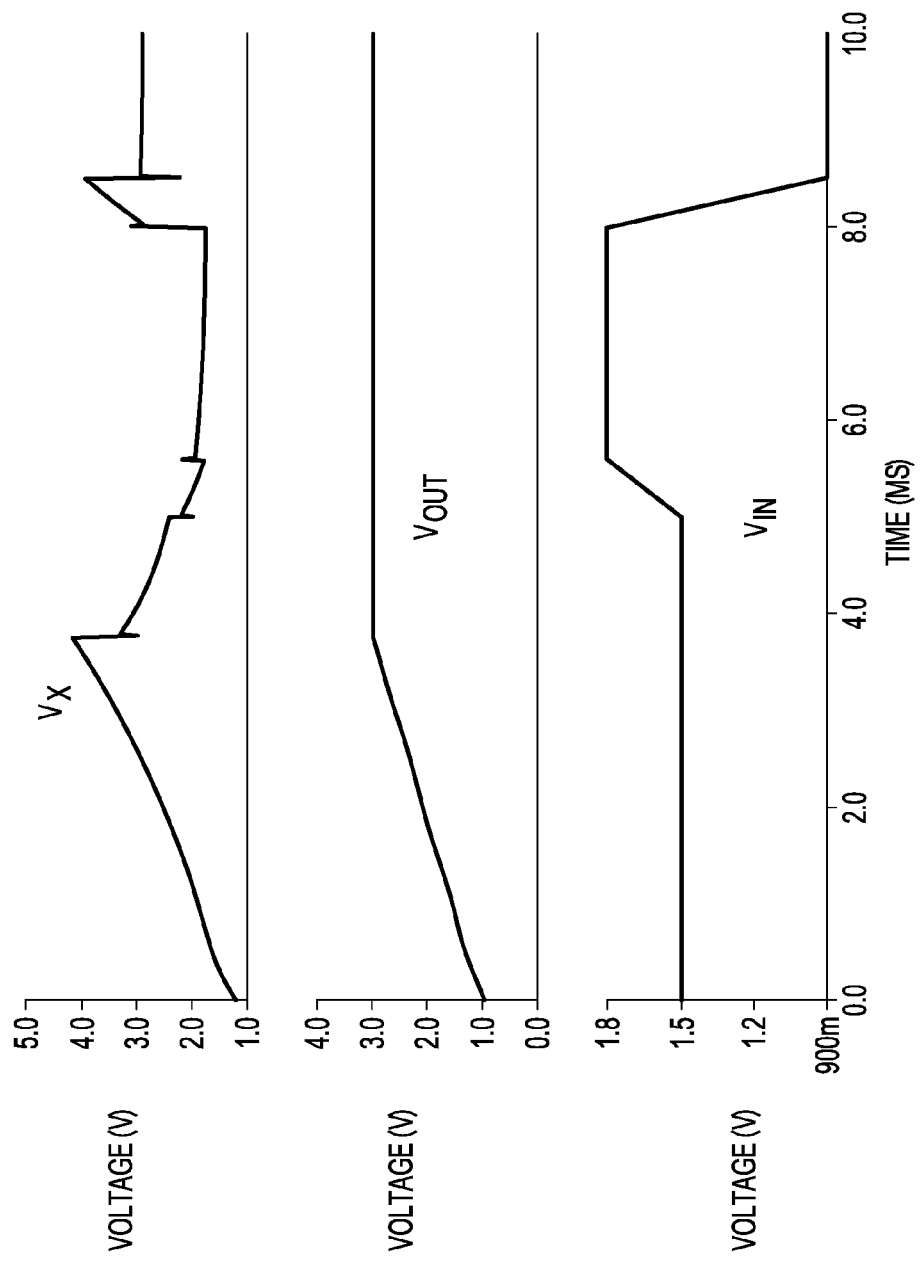
FIG. 3 is a set of graphs illustrating simulated operation of the charge pump circuit of FIG. 1 under various load current conditions.

FIGS. 2 and 3 illustrate examples of simulated operation of one embodiment of the regulator 104 designed for maintaining $V_{OUT}$ of the charge pump 102 at a desired 3.0V when $V_{IN}$ of the charge pump is at a nominal 1.5V. At $V_{IN}$ values below about 900 mV, it becomes very difficult to bias the amplifier 130. As a result, the amplifier 130 would have low gain and the loop performance would be compromised. These simulations assume that the threshold voltage $V_T$ of the devices of the regulator is 800 mV. These simulations assume that $V_{REF}$ is related to a bandgap voltage of 600 mV. These simulations assume that the charge pump 102 is a single-stage Dickson charge pump that uses MOSFETs connected as diodes. The frequency of the clock signal in these simulations is fixed and set at 200 kHz.

Referring now to FIG. 2, which illustrates how the regulator 104 advantageously maintains the output voltage of the charge pump 102 at the target $V_{OUT}$ value in spite of variation in $I_{LOAD}$. The four graphs demonstrate that the regulator 104 is able to maintain a constant output voltage $V_{OUT}$ of the charge pump 102 when the load $I_{LOAD}$ varies. The top graph shows that $V_{REF}$ is fixed at 600 mV, and, at start-up of the charge pump circuit 100, that $V_{OUT}$* slowly increases and reaches $V_{REF}$ about 4 ms after start-up. The bottom graph shows that from t=0 to about t=4 ms, the charge pump 102 is starting and that $V_{OUT}$ reaches the target output voltage $V_{OUT}$=3V after about t=4 ms. The third graph shows that after the charge pump circuit 100 finishes starting, the output $V_X$ of the amplifier 130 drops to about 2.5V, which is the value that maintains $V_{OUT}$ at the target 3V. The third graph also shows that, when $I_{LOAD}$ increases (see the second graph) to about 400 µA at about 7 ms, the value of $V_X$ increases to about 4V to keep $V_{OUT}$ at a constant value of 3V. The third graph also shows that, when $I_{LOAD}$ decreases (see the second graph) to about 100 µA at about 9 ms, the value of $V_X$ decreases to keep $V_{OUT}$ at the constant value of 3V. The third graph shows that, when $I_{LOAD}$ changes (see the second graph), there are advantageously no spikes or variations in the value of $V_{OUT}$. The value of $V_X$ depends on $V_{IN}$ and on the load current $I_{LOAD}$ at the output of the charge pump 102. In the set of graphs illustrated in FIG. 2, the value of $V_{IN}$ is not specified, but a constant value of $V_{IN}$, such as 1.5V, is being applied to the charge pump 102. The regulator 104 is configured so that the value of $V_X$ keeps $V_{OUT}$ constant.

Referring now to FIG. 3, which illustrates how the regulator 104 advantageously maintains the output voltage of the charge pump 102 at the target $V_{OUT}$ value in spite of variation in $V_{IN}$. The top graph shows that $V_X$ starts at about 1V and rises almost linearly to about 4V and then drops to 3V because $V_X$ tracks $V_{OUT}$ which starts at about 1V and rises to about 3V. The bottom graph shows that, at about 5 ms after the charge pump 102 starts, $V_{IN}$ is changed from about 1.5V to about 1.8V. At about 8 ms after the charge pump 102 starts, $V_{IN}$ is changed from about 1.8V to about 0.9V. The top graph shows than $V_X$ changes in response to the aforesaid changes in V. The middle graph shows that $V_{OUT}$ reaches its target output voltage of 3V after about 4 ms. The middle graph also shows that when $V_{IN}$ changes (see the bottom graph), there are advantageously no spikes or variations in the value of $V_{OUT}$. When $V_{IN}$ becomes larger (going from about 1.5V to about 1.8V), a smaller $V_X$ is needed. Therefore, in response to $V_{IN}$ becoming larger, the amplifier 130 advantageously outputs a smaller $V_X$. When $V_{IN}$ becomes smaller (going from about 1.8V to about 0.9V), a larger $V_X$ is needed. Therefore, in response to $V_{IN}$ becoming smaller, the amplifier 130 advantageously outputs a larger $V_X$. In the set of graphs illustrated in FIG. 3, the value of $I_{LOAD}$ is not specified, but a constant load current, such as 200 µA, is being coupled to the output terminal 108 of the charge pump 102.

The charge pump circuit 100 has automatic gain control (AGC) implemented by clock amplitude feedback. The clock amplitude feedback is used to adjust the voltage gain of the charge pump circuit 100 according to its input voltage $V_{IN}$ and current load $I_{LOAD}$, thereby keeping $V_{OUT}$ constant.

A benefit of the regulator 104 is that it provides a wide range of the amplitude of the clock voltage that regulates $V_{OUT}$ according to variations in values of $I_{LOAD}$ and/or $V_{IN}$.

A benefit of the regulator 104 is that it provides good regulation of $V_{OUT}$ with changes in $I_{LOAD}$ when the $V_{IN}$ is close to, or above, the threshold voltage $V_T$.

A benefit of the regulator 104 is that it provides good regulation of $V_{OUT}$ with changes in $V_{IN}$ when the $V_{IN}$ is close to, or above, the threshold voltage $V_T$.

Although, in one embodiment, the regulator 104 is disposed on an integrated circuit fabricated using CMOS technology, the regulator 104 can also be disposed on an integrated circuit fabricated using other technologies. Although the invention has been described with respect to specific conductivity types or polarity of potentials, skilled artisans appreciated that conductivity types and polarities of potentials may be reversed.

The specification and figures are to be regarded in an illustrative rather than a restrictive sense, and all such modifications are intended to be included within the scope of the present invention. Any benefits, advantages or solutions to problems described herein with regard to specific embodiments are not intended to be construed as a critical, required or essential feature or element of any or all the claims. Unless stated otherwise, terms such as "first" and "second" are used to arbitrarily distinguish between the elements such terms describe.

Thus, these terms are not necessarily intended to indicate temporal or other prioritization of such elements. Note that the term "couple" has been used to denote that one or more additional elements may be interposed between two elements that are coupled.

Although the invention is described herein with reference to specific embodiments, various modifications and changes can be made without departing from the scope of the present invention as set forth in the claims below.

What is claimed is:

1. A regulator for a charge pump, the charge pump having a clock input terminal, an input terminal for receiving an input voltage and an output terminal for outputting an output voltage higher than the input voltage, the regulator comprising:

an amplifier, coupled to the charge pump, for producing a $V_X$ signal responsive to the output voltage of the charge pump; and a clock amplitude modulator coupled to the clock input terminal of the charge pump and to the amplifier, the clock amplitude modulator for producing at least one clock signal having an amplitude controlled by the $V_X$ signal, wherein a maximum amplitude of the at least one clock signal is a voltage higher than the input voltage of the charge pump, wherein a magnitude of the output voltage of the charge pump is controlled, at least in part, by the amplitude of the at least one clock signal.

2. The regulator of claim 1, wherein the clock amplitude modulator is powered by a voltage higher than the input voltage of the charge pump.

3. The regulator of claim 2, wherein the clock amplitude modulator is powered by the output voltage of the charge pump, and wherein the maximum amplitude of the at least one clock signal is the output voltage of the charge pump.

4. The regulator of claim 1, including an auxiliary stage for producing an auxiliary voltage $V_{AUX}$ higher than the input voltage of the charge pump, wherein the clock amplitude modulator is powered by $V_{AUX}$, and wherein the maximum amplitude of the at least one clock signal is $V_{AUX}$.

5. The regulator of claim 4, wherein the auxiliary voltage $V_{AUX}$ is higher than the output voltage of the charge pump.

6. The regulator of claim 1, including a feedback loop from the output terminal of the charge pump to the clock input terminal of the charge pump, the feedback loop for setting a new value for the amplitude of the at least one clock signal based on a present value of the output voltage of the charge pump.

7. The regulator of claim 1, wherein the amplifier has an input terminal for receiving a reference voltage $V_{REF}$ and another input terminal for receiving $V_{OUT}^*$, and wherein a value of $V_X$ is produced as a result of comparing $V_{REF}$ and $V_{OUT}^*$.

8. The regulator of claim 7, wherein a value of reference voltage $V_{REF}$ is related to one of: a bandgap voltage and $V_{IN}$.

9. A charge pump circuit, comprising:

a charge pump for producing an output voltage $V_{OUT}$ from an input voltage $V_{IN}$, wherein $V_{OUT}$ is higher than $V_{IN}$; and a regulator, coupled to the charge pump, the regulator including:

an amplifier, for producing a $V_X$ signal responsive to $V_{OUT}$, and a clock amplitude modulator, coupled to the amplifier, for producing at least one clock signal having an amplitude controlled by the $V_X$ signal, wherein a maximum amplitude of the at least one clock signal is a voltage higher than $V_{IN}$, wherein a magnitude of $V_{OUT}$ is controlled, at least in part, by the amplitude of the at least one clock signal.

10. The charge pump circuit of claim 9, wherein the clock amplitude modulator is powered by a voltage higher than $V_{IN}$.

11. The charge pump circuit of claim 10, wherein the clock amplitude modulator is powered by $V_{OUT}$, and wherein the maximum amplitude of the at least one clock signal is $V_{OUT}$.

12. The charge pump circuit of claim 9, including an auxiliary stage for producing an auxiliary voltage $V_{AUX}$ higher than $V_{IN}$, wherein the clock amplitude modulator is powered by $V_{AUX}$, and wherein the maximum amplitude of the at least one clock signal is $V_{AUX}$.

13. The charge pump circuit of claim 9, wherein a magnitude of $V_{OUT}$ is controlled, at least in part, by the amplitude and frequency of the at least one clock signal.

14. The charge pump circuit of claim 9, in which the regulator includes a feedback loop from an output terminal of the charge pump to a clock input terminal of the charge pump, the feedback loop for setting a new value for the amplitude of the at least one clock signal based on a present value of $V_{OUT}$.

15. The charge pump circuit of claim 14, wherein the amplifier and the clock amplitude modulator form at least part of the feedback loop.

16. The charge pump circuit of claim 15, wherein the feedback loop includes a voltage divider, coupled between the output terminal of the charge pump and the amplifier, that produces a voltage $V_{OUT}^*$ from $V_{OUT}$, wherein $V_{OUT}^*$ is less than $V_{OUT}$.

17. The charge pump circuit of claim 16, wherein the feedback loop of the regulator adjusts the amplitude of the at least one clock signal according to a present value of $V_{IN}$ and a present value of $I_{LOAD}$ of the charge pump to maintain a constant $V_{OUT}$.

18. The charge pump circuit of claim 16, wherein the feedback loop of the regulator adjusts a voltage gain of the charge pump to maintain a constant $V_{OUT}$ under a varying $V_{IN}$ condition and/or a varying $I_{LOAD}$ condition.

19. A method for regulating an output voltage of a charge pump that has an input voltage and an output voltage higher than the input voltage, comprising:

producing, by a circuit other than the charge pump, an auxiliary voltage $V_{AUX}$ higher than the input voltage of the charge pump;

producing, by a second circuit, a $V_X$ signal responsive to the output voltage of the charge pump;

producing, by a third circuit powered by $V_{AUX}$, at least one clock signal having a frequency and an amplitude, wherein the amplitude of the at least one clock signal is controlled by the $V_X$ signal, and wherein a maximum amplitude of the at least one clock signal is a voltage higher than the input voltage of the charge pump; and controlling a magnitude of the output voltage of the charge pump, at least in part, by changing the amplitude of the at least one clock signal.

20. The method of claim 19, wherein the amplitude and the frequency of the at least one clock signal is controlled by the $V_X$ signal, and wherein the magnitude of the output voltage of the charge pump is controlled by changing the frequency of the clock signal concurrently with changing the amplitude of the at least one clock signal.

* * * * *